Nov. 24, 1964 A. N. BAUMANN 3,158,439
PRODUCTION OF POTASSIUM CARBONATES
Filed Nov. 17, 1960
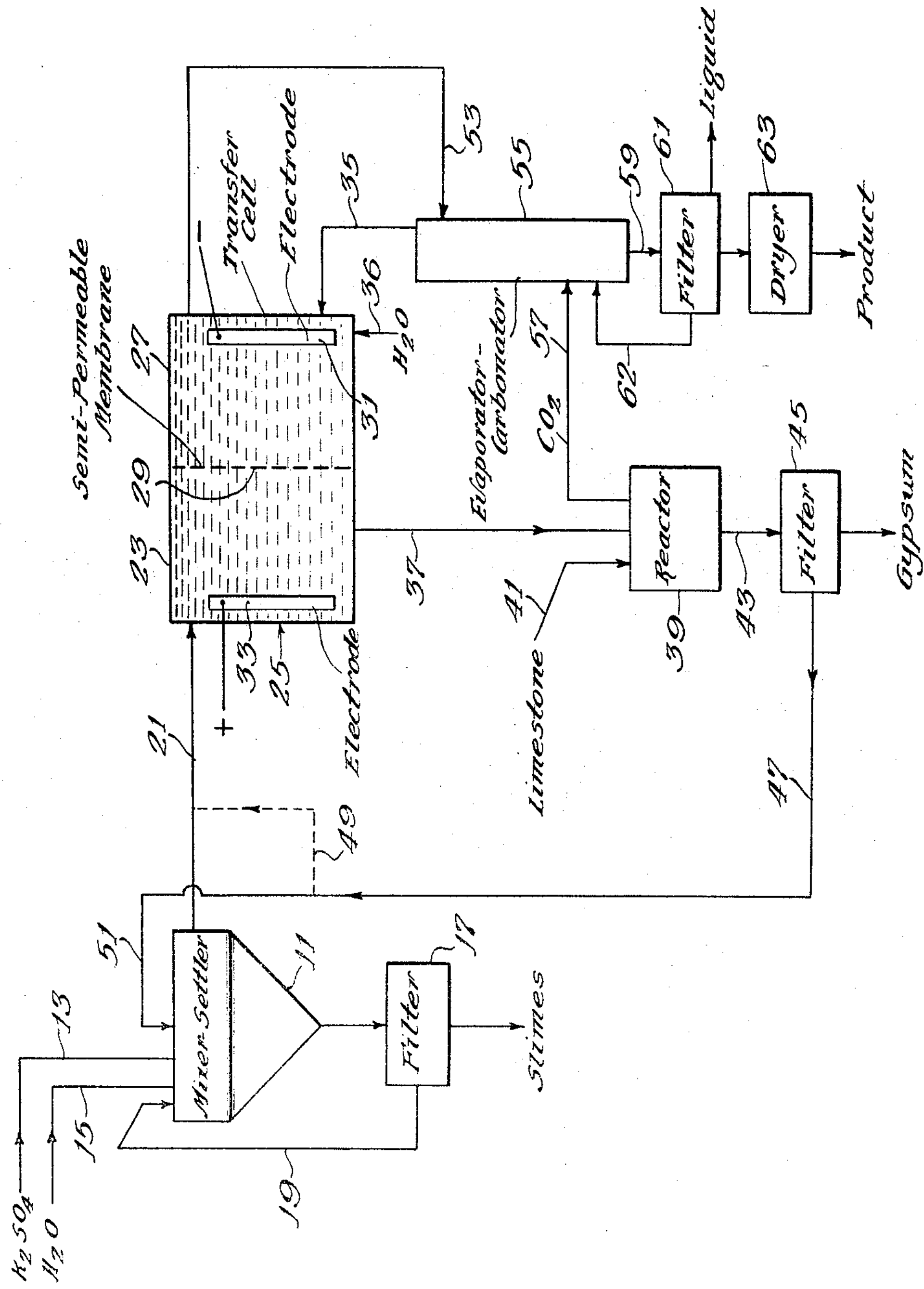

United States Patent Office 3,158,439

Patented Nov. 24, 1964

3,158,439

PRODUCTION OF POTASSIUM CARBONATES

Arthur N. Baumann, Lakeland, Fla., assignor to International Minerals & Chemical Corporation, a corporation of New York Filed Nov. 17, 1960, Ser. No. 69,999
12 Claims. (Cl. 23—63)

The present invention generally relates to the production of potassium carbonate and potassium bicarbonate. More particularly it relates to the production of a carbonate of potassium from potassium sulfate.

Potassium carbonate is generally produced by the carbonation of electrolytic potassium hydroxide or by the two-step Engel process, involving first the precipitation of $KHCO_3 \cdot MgCO_3 \cdot 4H_2O$ and then the recovery of potassium carbonate by decomposition of the double salt with hot water into insoluble basic magnesium carbonate and a solution of potassium carbonate. Potassium bicarbonate can be prepared by passing carbon dioxide into a concentrated solution of potassium carbonate, or by exposing moist potassium carbonate to carbon dioxide, preferably under moderate pressures. Potassium bicarbonate is considerably less soluble than potassium carbonate.

Potassium sulfate is extensively used as a fertilizer ingredient. Potassium sulfate, especially agricultural grade potassium sulfate is considerably less expensive than the carbonates and methods for producing the carbonates from the sulfate are constantly being investigated.

Accordingly, it is an object of the present invention to provide a process for producing potassium carbonates.

It is another object of the present invention to provide a process for producing potassium carbonates from potassium sulfate.

It is a further object of the present invention to provide a process for producing a high grade potassium carbonate product from agricultural grade potassium sulfate.

These and other objects and advantages of the present invention will be apparent from a description of the invention.

Generally described, the present invention is a process for producing a carbonate of potassium from potassium sulfate which comprises introducing an aqueous solution of potassium sulfate into one compartment of a transfer zone which is divided into two compartments by a semi-permeable membrane, introducing an aqueous medium having a potassium ion concentration lower than in said aqueous solution into the other compartment of said transfer zone, said semi-permeable membrane having characteristics which permit potassium ions to pass from said aqueous solution through said membrane into said aqueous medium, carbonating the aqueous medium to produce a carbonate of potassium, withdrawing from said one compartment an aqueous solution of potassium sulfate having a potassium ion concentration less than in the solution introduced into said one compartment, reacting said withdrawn aqueous solution with a basic calcium compound to form a calcium sulfate precipitate, separating said calcium sulfate precipitate from the potassium sulfate aqueous solution and recycling at least a portion of said potassium sulfate containing aqueous solution to said transfer zone.

In accordance with the present invention an aqueous solution of potassium sulfate is introduced into a transfer zone. The aqueous solution may be prepared by dissolving potassium sulfate of suitable purity in water or in an unsaturated aqueous solution of potassium sulfate. The potassium sulfate may be substantially pure material, however, a high purity potassium carbonate product may be produced in the process from relatively impure potassium sulfate; for example, a high purity potassium carbonate may be prepared from agricultural grade potassium sulfate. Agricultural grade potassium sulfate frequently contains slimes which are finely divided water insoluble clay type minerals. These slimes are preferably substantially removed from the solution before it is contacted with the semi-permeable membrane. The process of the present invention operates more efficiently at higher potassium sulfate concentrations and, therefore, the aqueous solution of potassium sulfate is preferably substantially saturated, however, low concentrations may be used when desired.

The concentrated, substantially slime-free, aqueous solution of potassium sulfate is passed into the transfer zone which is divided into two compartments by a semi-premeable membrane. The semi-permeable membrane has characteristics which permit the potassium ions to pass through while retaining the larger size sulfate ions on the same side of the membrane. Such semi-permeable membranes have mobile cations. These membranes are readily available and the theory whereby the potassium ions migrate or pass through the semi-permeable membrane is discussed in various physical chemistry text books as well as in many technical books and papers which deal with the general subject of dialysis and ion transfer through membranes. The transfer cell may be termed a dialysis cell; however the term transfer is used herein since dialysis frequently conveys the meaning that the process deals with colloids which is not the meaning that is intended to be conveyed in the present invention. In the process of the present invention the potassium and sulfate are present as ions in the aqueous solution and it is the potassium ion that migrates through the ion selective semi-permeable membrane. The membrane is, therefore, in effect, an ionic sieve which permits an exchange of the positive potassium ions, or cations, from the potassium sulfate solution for hydrogen ions in the aqueous medium through its mobile cations. These ions which have the same charge as the mobile cations of the membrane can pass through the membrane whereas the anions such as $OH^-$, $CO_3^=$, $SO_4^=$ ions are retarded by the membrane. A suitable membrane is Nafilm-1 which is a trademark of a membrane made by the National Aluminate Corporation. This semi-permeable membrane is an anionic type and contains sulfonic groups having mobile cationics. This membrane permits the passage of the potassium ions from the concentrated potassium sulfate solution into the aqueous medium on the other side of the membrane in which the potassium ion concentration is maintained lower. While this type of membrane permits the passage of potassium ions therethrough, the membrane retards the passage of sulfate ions. Other membranes having the desired physical characteristics or functions may, of course, be used.

An aqueous medium which may be substantially pure water or an aqueous carbonic acid solution or other suitable aqueous solutions of low or no potassium ion content is introduced into the transfer zone into a compartment which is separated from the potassium sulfate solution in the transfer zone by the semi-permeable membrane. The potassium ions move through the semi-permeable membrane from the potassium sulfate solution to the aqueous medium on the other side of the semi-permeable membrane. It is preferred that the potassium ion concentration differential across the semi-permeable membrane be high so as to achieve a high rate of transfer of potassium ions from the potassium sulfate solution to the aqueous medium. Therefore, the potassium ion concentration in the aqueous medium should be maintained as low as is reasonably practical. This may be effected by introducing an aqueous medium having a very low potassium ion content into the transfer zone and removing the aqueous medium from the transfer zone before the potassium ion concentration in the aqueous medium becomes too high. This may be effected by operating the transfer cell on a continuous basis wherein the potassium ions which pass through the semi-permeable membrane are continuously removed from the second compartment of the transfer zone. The aqueous medium removed from the transfer zone, which aqueous medium contains the potassium ions which passed through the semi-permeable membrane, may be carbonated to produce a carbonate of potassium which may be potassium carbonate or potassium bicarbonate by any suitable process. Many processes for carbonation are well known to the art. The carbonate of potassium may be recovered in any suitable manner. For example, the solution may be evaporated to precipitate potassium carbonate crystals therefrom, which potassium carbonate crystals may be recovered by any suitable method such as filtration or centrifugal separation. The potassium carbonate may then be dried to fom a final product of the process.

The transfer of potassium ions through the semi-permeable membrane may be accelerated by placing electrodes in the transfer zone, with a negative electrode being placed in the aqueous medium and a positive electrode being placed in the potassium sulfate solution. The electric current passing through the transfer zone accelerates or hastens the transfer of potassium ions through the semi-permeable membrane. The use of electrodes to effect a more rapid transfer through a membrane is well known and is generally referred to as electrodialysis. The aqueous solution and medium may be at ambient temperature; however, higher or lower temperatures may be used when desired.

In accordance with the present invention, an aqueous potassium sulfate solution having a potassium ion concentration less than in the potassium sulfate solution introduced into the transfer zone is removed from the transfer zone and is reacted with a basic calcium compound. The basic calcium compound is preferably a limestone such as porous chalkyl calcerenite, although other materials such as calcium oxide or hydrated or slaked lime may be used. The amount of basic calcium compound added to the potassium sulfate solution is below that at which syngenite ($K_2SO_4 \cdot CaSO_4 \cdot H_2O$), which is a very insoluble complex salt, forms. The amount of calcium carbonate, or other basic calcium compound, that is used is preferably stoichiometrically equivalent to the amount of potassium ion that has transferred through the semi-permeable membrane. In other words, an equivalent of calcium is supplied to the reaction zone for each equivalent of potassium that has transferred through the semi-permeable membrane in the transfer zone. The basic calcium compound reacts with the sulfate ions in the potassium sulfate containing solution to form a gypsum precipitate, which may readily be separated from the potassium sulfate solution by any suitable means such as filtration, centrifugal separation, etc. After the removal of the gypsum precipitate, the mother liquor, which is an aqueous solution containing potassium sulfate, is preferably recycled to the transfer zone. Additioanl potassium sulfate may be dissolved in the recycled mother liquor so as to form a more concentrated and preferably a saturated potassium sulfate solution. An embodiment of the present invention is illustrated in the accompanying drawing and is described in the following paragraphs.

Referring now to the drawing, agricultural grade potassium sulfate containing 92% $K_2SO_4$ and 0.3% by weight of water insolubles is introduced into a mixer-settler 11 via line 13. Water is also introduced into the mixer-settler 11 via line 15 in an amount to form a substantially saturated solution of potassium sulfate. A recycle stream, produced as hereinafter described, is also introduced into the mixer-settler 11 via line 51. The water insolubles or slimes settle to the bottom of the cone shaped section of the mixer-settler and are introduced to a filter 17. In the filter 17 the slimes are removed and the filtrate is recycled to the mixer-settler 11 through line 19.

A substantially saturated slimes-free aqueous solution of potasisum sulfate is withdrawn from the mixer-settler through line 21 and is introduced into one compartment 23 of a transfer cell 25 which is separated into two compartments, 23 and 27, by a semi-permeable membrane 29. A negative electrode 31 is positioned in compartment 27 and a positive electrode 33 is positioned in compartment 23. These electrodes, 31 and 33 are connected to a suitable source of electrical energy (not shown). An aqueous medium is introduced into compartment 27 via line 35.

Potassium ions transfer through the semi-permeable membrane from compartment 23 into compartment 27 and the transfer is accelerated by the electric current passing between the electrodes 31 and 33.

A potassium sulfate solution is withdrawn from compartment 23 through line 37 and is introduced into a reaction zone or reactor 39. Since some potassium ions passed out of the solution in compartment 23 through the semi-permeable membrane, the potassium ion concentration in line 37 is less than that in the solution introduced into the compartment via line 21.

In the reactor 39, the aqueous solution is reacted with limestone $CaCO_3$ which is introduced into the reactor through line 41. The amount of $CaCO_3$ introduced is equivalent to the amount of potassium ion that passed through the membrane 29 from compartment 23 into compartment 27. The reaction of the solution with limestone produces a gypsum (calcium sulfate) precipitate and carbon dioxide gas. The solution containing the gypsum is withdrawn from the reactor 39 through line 43 and is introduced to a filter 45 in which the gypsum solids are separated from the potassium sulfate containing solution. The solution contains potassium values and the solution is, therefore, recycled to the transfer cell 25 via line 47 and dotted line 49 which is connected to inlet line 21. It is, however, preferable to increase the potassium ion concentration of the solution in line 47 and, accordingly, in a preferred operation the solution in line 47 is continued through line 51 into the mixer-settler 11 in which the solution is again saturated with respect to potassium sulfate.

Referring back to compartment 27 of the transfer cell 25, an aqueous solution containing potassium ions is withdrawn from the compartment through line 53 and is introduced into a carbonator-evaporator 55. The carbon dioxide gas produced in reactor 39 is also introduced into the carbonator-evaporator 55 via line 57. In the vessel 55, the carbon dioxide reacts with the potassium ion solution introduced to the vessel via line 53 and a carbonate of potassium is formed. The vessel 55 is also operated as an evaporator and the solution is concentrated by evaporating water. The evaporation and carbonation are effective to produce potassium carbonate crystals, or when the carbonation is to a greater degree, to produce potassium bicarbonate crystals. The water removed during the evaporation in vessel 55 is introduced into compartment 27 of the transfer cell 25 through line 35. Make-up water may also be introduced into compartment 27 through line 36.

The concentrated aqueous solution containing crystals of a carbonate of potassium is withdrawn from vessel 55 through line 59 and is introduced to a filter 61 wherein the crystals are separated from the liquid phase. The mother liquor from filter 61 is preferably recycled to vessel 55 through line 62. The crystals may then be dried in a dryer 63 and recovered as product or may be further treated as desired.

In order to give a fuller understanding of the invention but with no intention to be limited thereto, the following specific example is given.

*Example*

A test cell having an effective semi-permeable membrane area of about one square inch was used in this test. The membrane used was an anionic type and contained sulfonic groups having mobile cations. The membrane was distributed by the National Aluminate Corporation under the trademark Nafilm-1. Carbon electrodes were placed in each of the compartments of the cell. A substantially saturated solution of potassium sulfate was placed in one compartment of the cell and distilled water was placed in the other. At the time the current was turned on some of the potassium ions had already passed through the membrane to give an aqueous solution containing 0.28% by weight of $K_2O$. A current of about 0.2 ampere was maintained in the cell by a 6 volt storage battery connected to the electrodes. At the end of 15½ hours, the $K_2O$ content in the compartment in which the distilled water was placed was 3.5% $K_2O$ by weight.

The description of the invention utilized specific reference to certain process details; however, it is to be understood that such details are illustrative only and not by way of limitation. Other modifications and equivalents of the invention will be apparent to those skilled in the art from the foregoing description.

I claim:

1. A process for producing a carbonate of potassium from potassium sulfate which comprises introducing an aqueous solution of potassium sulfate into one compartment of a transfer zone which is divided into two compartments by a semi-permeable membrane, introducing an aqueous medium having a potassium ion concentration lower than in said aqueous solution into the other compartment of said transfer zone, said semi-permeable membrane having characteristics which permit potassium ions to pass from said aqueous solution through said membrane into said aqueous medium, carbonating the aqueous medium to produce a carbonate of potassium, withdrawing from said one compartment an aqueous solution of potassium sulfate having a potassium ion concentration less than in said solution introduced into said one compartment, reacting said withdrawn aqueous solution with a basic calcium compound to form a calcium sulfate precipitate, separating said calcium sulfate precipitate from the potassium sulfate containing aqueous solution and recycling at least a portion of said potassium sulfate containing aqueous solution to said transfer zone.

2. The process of claim 1 wherein said semi-permeable membrane is an anionic type containing sulfonic groups having mobile cations.

3. The process of claim 1 wherein said solution of potassium sulfate introduced into said one compartment is substantially saturated with respect to potassium sulfate.

4. The process of claim 1 wherein said basic calcium compound comprises calcium carbonate.

5. The process of claim 1 wherein said basic calcium compound is provided in an amount equivalent to the amount of potassium that passed through said semi-permeable membrane.

6. A process for producing a carbonate of potassium from agricultural grade potassium sulfate containing water insolubles which comprises dissolving agricultural grade potassium sulfate in water, removing undissolved solids from the resultant solution, introducing the potassium sulfate solution from which the undissolved solids have been removed into one compartment of a transfer zone which is divided into two compartments by a semi-permeable membrane having mobile cations, introducing an aqueous medium having a potassium ion concentration lower than in said aqueous solution into the other compartment of said transfer zone, said semi-permeable membrane having characteristics which permit potassium ions to pass from said aqueous solution through said membrane into said aqueous medium, carbonating the aqueous medium to produce a carbonate of potassium, withdrawing from one compartment an aqueous solution of potassium sulfate having a potassium ion concentration less than in said solution introduced into said one compartment, reacting said withdrawn aqueous solution with a basic calcium compound to form a calcium sulfate precipitate, separating said calcium sulfate precipitate from the potassium sulfate containing aqueous solution and recycling at least a portion of said potassium sulfate containing aqueous solution to said transfer zone.

7. The process of claim 6 wherein said semi-permeable membrane is an anionic type containing sulfonic groups having mobile cations.

8. The process of claim 6 wherein said solution of potassium sulfate introduced into said one compartment is substantially saturated with respect to potassium sulfate.

9. The process of claim 6 wherein said basic calcium compound comprises calcium carbonate.

10. The process of claim 6 wherein said basic calcium compound is provided in an amount equivalent to the amount of potassium that passed through said semi-permeable membrane.

11. The process of claim 6 wherein an electric current is provided in said transfer zone to accelerate the transfer of potassium ions through said semi-permeable membrane.

12. A process for producing a carbonate of potassium from agricultural grade potassium sulfate containing water insolubles which comprises dissolving agricultural grade potassium sulfate in water, removing undissolved solids from the resultant solution, introducing the potassium sulfate solution from which the undissolved solids have been removed into one compartment of a transfer zone which is divided into two compartments by a semi-permeable membrane having mobile cations, introducing an aqueous medium having a potassium ion concentration lower than in said aqueous solution into the other compartment of said transfer zone, said semi-permeable membrane having characteristics which permit potassium ions to pass from said aqueous solution through said membrane into said aqueous medium, carbonating the aqueous medium to produce a carbonate of potassium, withdrawing from one compartment an aqueous solution of potassium sulfate having a potassium ion concentration less than in said solution introduced into said one compartment, reacting said withdrawn aqueous solution with calcium carbonate to form a calcium sulfate precipitate and carbon dioxide, separating said calcium sulfate precipitate from the potassium sulfate containing aqueous solution and recycling at least a portion of said potassium sulfate containing aqueous solution to said transfer zone, and effecting said carbonating of said aqueous medium with the carbon dioxide formed by the reacting of said withdrawn aqueous solution with calcium carbonate.

References Cited in the file of this patent

UNITED STATES PATENTS

| | | |
|---|---|---|
| 2,044,942 | Heckert | June 23, 1936 |
| 2,780,520 | Pike | Feb. 5, 1957 |

OTHER REFERENCES

Donnan: "Chemical Reviews," vol. 1; pages 73–90, April 1924.

Glueckauf: "Faraday Society Discussions," No. 21, pages 129–130; 1956.

"Amberplex Ion Permeable Membranes," Rohm and Haas Company, 1952.